US011573981B1

(12) United States Patent
Goyal et al.

(10) Patent No.: US 11,573,981 B1
(45) Date of Patent: Feb. 7, 2023

(54) AUTO-SCALING USING TEMPORAL SPLITS IN A TIME-SERIES DATABASE

(71) Applicant: Amazon Technologies, Inc., Seattle, WA (US)

(72) Inventors: Dumanshu Goyal, Seattle, WA (US); Nabanita Maji, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 16/579,717

(22) Filed: Sep. 23, 2019

(51) Int. Cl.
*G06F 16/27* (2019.01)
*G06F 16/2455* (2019.01)
*G06F 16/21* (2019.01)

(52) U.S. Cl.
CPC ............ *G06F 16/278* (2019.01); *G06F 16/21* (2019.01); *G06F 16/24568* (2019.01)

(58) Field of Classification Search
CPC ... G06F 16/278; G06F 16/21; G06F 16/24568
See application file for complete search history.

(56) References Cited

U.S. PATENT DOCUMENTS

| | | | |
|---|---|---|---|
| 6,256,634 B1 | 7/2001 | Moshaiov et al. |
| 8,132,046 B2 | 3/2012 | Varghese |
| 8,276,154 B2 | 9/2012 | Toub et al. |
| 8,335,765 B2 | 12/2012 | Sivasubramanian et al. |
| 8,386,540 B1 | 2/2013 | McAlister et al. |
| 8,595,547 B1 | 11/2013 | Sivasubramanian et al. |
| 8,601,112 B1 | 12/2013 | Nordstrom et al. |
| 8,965,849 B1 | 2/2015 | Goo |
| 9,286,001 B2 | 3/2016 | Skjolsvold et al. |
| 9,449,122 B2 | 9/2016 | Haas et al. |
| 9,607,019 B1 | 3/2017 | Swift et al. |
| 9,607,067 B2 | 3/2017 | Haas et al. |
| 9,626,374 B2 | 4/2017 | Hirsch et al. |
| 9,672,257 B2 | 6/2017 | Tobin et al. |

(Continued)

OTHER PUBLICATIONS

U.S. Appl. No. 16/116,791, filed Aug. 29, 2018, Mustafa Ozan Ozen.

(Continued)

*Primary Examiner* — Ashish Thomas
*Assistant Examiner* — Dustin D Eyers
(74) *Attorney, Agent, or Firm* — Alexander A. Knapp; Kowert, Hood, Munyon, Rankin & Goetzel, P.C.

(57) ABSTRACT

Methods, systems, and computer-readable media for auto-scaling using temporal splits in a time-series database are disclosed. One or more stream processors of a time-series database write time-series data of a plurality of time series into a plurality of two-dimensional tiles, including an individual tile representing spatial boundaries and temporal boundaries. The heat of time-series data written to the individual tile exceeds a threshold. The current time is compared to the temporal boundaries, and the comparison indicates that the current time is beyond a threshold point within the temporal boundaries. Based at least in part on the comparison, a split is performed of the individual tile into a first new tile and a second new tile. The first new tile represents the spatial boundaries and a first portion of the temporal boundaries, and the second new tile represents the spatial boundaries and a second portion of the temporal boundaries.

20 Claims, 10 Drawing Sheets

(56) References Cited

U.S. PATENT DOCUMENTS

| | | | |
|---|---|---|---|
| 9,773,015 | B2 | 9/2017 | Guo et al. |
| 9,817,727 | B2 | 11/2017 | McAlister et al. |
| 9,836,492 | B1 | 12/2017 | Hermanson |
| 9,934,107 | B1 | 4/2018 | Chikkanayakanahally et al. |
| 10,007,513 | B2 | 6/2018 | Malladi et al. |
| 2008/0052322 | A1 | 2/2008 | Gusciora |
| 2010/0121817 | A1 | 5/2010 | Meyer et al. |
| 2010/0153953 | A1 | 6/2010 | Adl-Tabatabai et al. |
| 2011/0083046 | A1* | 4/2011 | Andrade ............ G06F 11/0793 714/47.1 |
| 2016/0260018 | A1* | 9/2016 | Ogawa ..................... G06N 5/04 |
| 2018/0300609 | A1* | 10/2018 | Krishnamurthy .... G06N 3/0445 |
| 2018/0314616 | A1* | 11/2018 | Savolainen ......... G06F 11/3433 |

OTHER PUBLICATIONS

U.S. Appl. No. 16/176,629, filed Oct. 31, 2018, Dumanshu Goyal.
U.S. Appl. No. 16/199,102, filed Nov. 23, 2018, Timothy A. Rath.
U.S. Appl. No. 16/199,103, filed Nov. 23, 2018, Timothy A. Rath.
U.S. Appl. No. 16/199,078, filed Nov. 23, 2018, Timothy A. Rath.
U.S. Appl. No. 16/267,330, filed Feb. 4, 2019, Dumanshu Goyal.
U.S. Appl. No. 16/008,940, filed Jun. 14, 2018, Rajneesh Kumar.
U.S. Appl. No. 16/216,580, filed Dec. 11, 2018, Dumanshu Goyal.
U.S. Appl. No. 16/219,686, filed Dec. 13, 2018, Dumanshu Goyal.
U.S. Appl. No. 16/287,822, filed Feb. 27, 2019, Dumanshu Goyal.
U.S. Appl. No. 16/453,914, filed Jun. 26, 2019, Gaurav Saxena.
U.S. Appl. No. 16/455,591, filed Jun. 27, 2019, Gaurav Saxena.
U.S. Appl. No. 16/579,715, filed Sep. 23, 2019, Dumanshu Goyal.
U.S. Appl. No. 17/349,786, dated Jun. 16, 2021, Sudipto Das.
U.S. Appl. No. 17/234,372, dated Apr. 19, 2021, Evgeniy Retyunskiy.

* cited by examiner

AUTO-SCALING USING TEMPORAL SPLITS IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
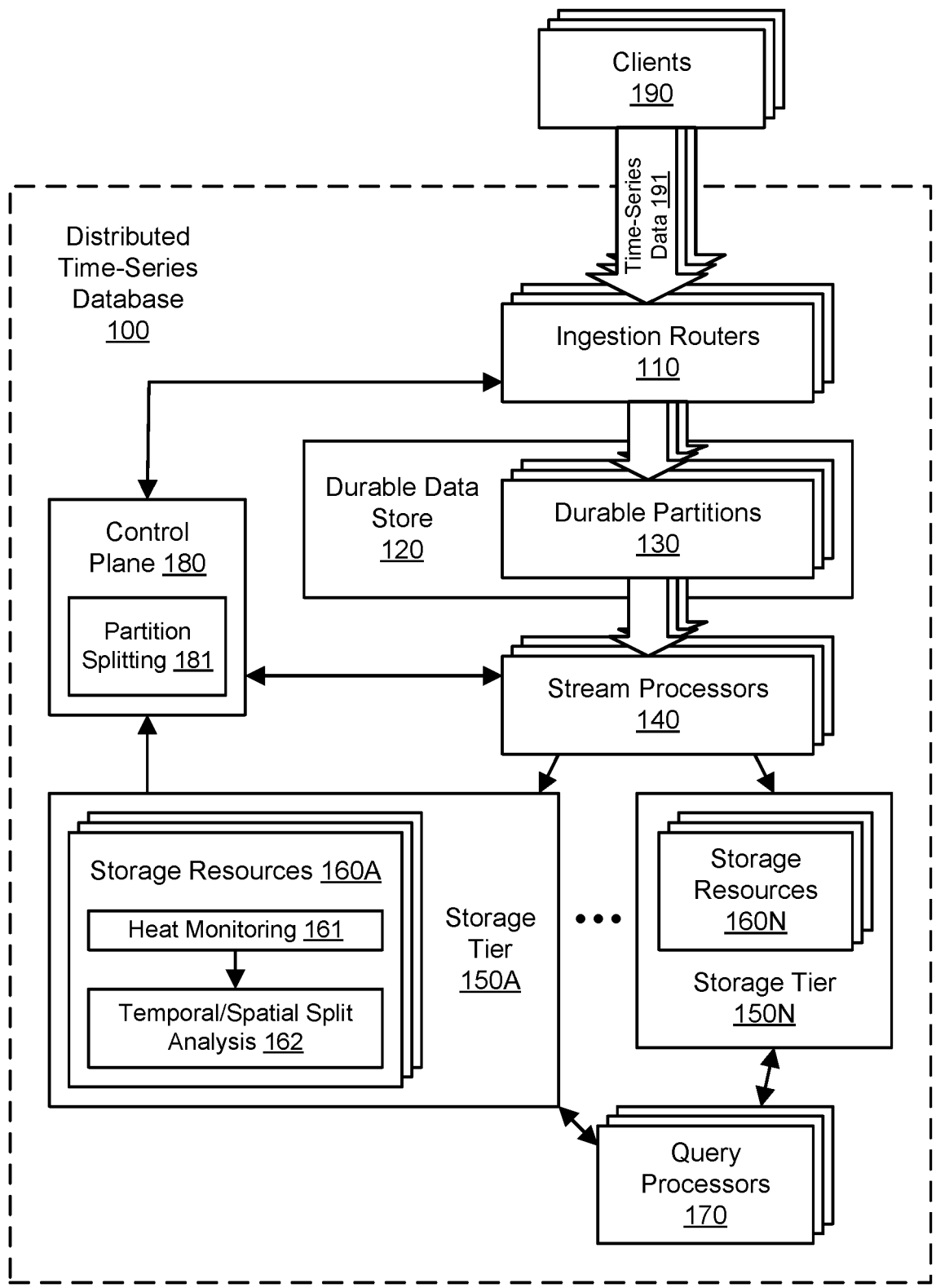
FIG. 1 illustrates an example system environment for auto-scaling using temporal splits in a time-series database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for auto-scaling using temporal splits in a time-series database are described. A distributed time-series database hosted in the cloud may include a set of ingestion routers that receive and spatially partition time-series data into a set of non-overlapping partitions. The time-series database may also include a set of stream processors, also referred to as writers, which process the time-series data in the partitions. For example, the stream processors may write elements of time-series data to one or more storage tiers, such as a "hot" tier that offers low-latency and high-availability write and read access to a set of distributed storage nodes. In one or more of the storage tiers, time-series data may be partitioned both spatially and temporally into two-dimensional tiles having both spatial and temporal boundaries. Time-series data within the spatial and temporal boundaries of a particular tile may be written to that tile. A tile may be created with a predetermined storage capacity (e.g., using memory resources or storage resources of a storage node).

The tile's heat or other usage metric(s) may be monitored by the storage node that maintains the tile. In some circumstances, the heat associated with a tile may be sufficiently high that the tile lacks the storage capacity to hold the anticipated amount of time-series data within the spatial and temporal boundaries of the tile. If the heat or other metric(s) indicate that the tile cannot hold all the anticipate data within its boundaries, the storage node may decide (or request) to perform either a spatial split of the tile or a temporal split of the tile. A spatial split may generate two (or more) tiles with the original temporal boundaries but having respective portions of the original spatial boundaries, e.g., by redistributing different time series across the new tiles. A temporal split may generate two (or more) tiles with the original spatial boundaries but having respective portions of the original temporal boundaries, e.g., with one tile's temporal boundaries ending at a split point and the other tile's temporal boundaries beginning at the split point. Spatial splits may require the movement of data from the original tile to one or more of the tiles resulting from the split and potentially from one storage node to another. While the data is being moved during the spatial split, data may accumulate on the same partition, potentially resulting in throttling the workload or threatening the durability of time-series data. On the other hand, temporal splits may not require such data movement. In some embodiments, a temporal split may be performed rather than a spatial split if one or more conditions are met, e.g., if a predetermined percentage of the tile's temporal range has passed (and thus a spatial split would require excessive data movement), if the tile's temporal range is not less than a minimum value (to prevent tiles from representing very short times), if the current time is within the tile's temporal boundaries, if the current time plus a buffer time is before the end of the tile's temporal boundaries, and so on. Using the techniques described herein, auto-scaling of two-dimensional tiles in a time-series database may be performed using temporal splits instead of spatial splits to reduce data movement for current tiles (e.g., tiles whose temporal ending points have not been reached).

As one skilled in the art will appreciate in light of this disclosure, embodiments may be capable of achieving certain technical advantages, including some or all of the following: (1) improving the use of network resources in a distributed time-series database by reducing data movement resulting from spatial splits of two-dimensional tiles; (2) improving the use of computational resources in a distributed time-series database by reducing data movement resulting from spatial splits of two-dimensional tiles; (3) improving the scaling of a distributed time-series database by performing faster temporal splits of two-dimensional tiles instead of slower spatial splits; (4) improving the durability of stored data in a distributed time-series database by performing temporal splits instead of spatial splits that can result in data accumulation; (5) reducing tile fragmentation and improving query performance by enforcing a minimum time range for tiles; and so on.

FIG. 1 illustrates an example system environment for auto-scaling using temporal splits in a time-series database, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data. Using the techniques described herein, data structures storing time-series data may be auto-scaled along temporal boundaries in order to maintain the availability of the database for storing new data.

The ingested time-series data 191 may represent a large number (high cardinality) of individual time series. An individual time series may include a sequence of values or observations (e.g., for a feature of a system or a phenomenon) that can be plotted over time. An individual time series may be uniquely identified by a set of dimensions (with dimension values) such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on, as well as the measure name. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. A particular time series may be defined by a schema that includes components such as one or more dimension names (e.g., "Region") having one or more dimension values (e.g., "US-West") along with a measure name (e.g., "temperature") for the measurements that represent individual data points in the time series.

The ingestion routers 110 may use a clustering scheme to divide the ingested data 191 into the various partitions 130 to achieve better performance of data storage and retrieval. A partition may include one time series or multiple time series. The clustering scheme may co-locate related time series for optimization of queries and other tasks. The clustering scheme may represent hierarchical clustering or schema-based clustering. The clustering scheme may represent a multi-level hashing scheme. The ingestion partitions 130 may be maintained using persistent storage resources and may be termed durable partitions. In various embodiments, the durable partitions 130 may be provided by a streaming service or other durable data store 120. The streaming service or durable data store 120 may also be referred to as a journal. The streaming service or durable data store 120 may use shards or other divisions to implement the non-overlapping partitions 130. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

In addition to the ingestion routers 110, the database 100 may include hosts such as stream processors 140 and query processors 170. A fleet of stream processors 140 may take the time-series data from the durable partitions 130, potentially process the data in various ways, and add the data to one or more storage tiers 150A-150N. For example, one stream processor may write data from one partition to a "hot" storage tier, and another stream processor may write data from the same partition to a "cold" storage tier. In various embodiments, stream processors may perform reordering, deduplication, aggregation of different time periods, rollups, and other transformations on time series data.

Stream processors 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized. By performing auto-scaling using the temporal split techniques described herein, the high availability of the stream processors 140 to write newly ingested time-series data to the storage tier(s) 150A-150N may be maintained, e.g., without letting data accumulate in the durable partitions while spatial splits requiring data movement are performed.

The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, the stream processors 140 may organize the time series in tables. The stream processors 140 may also be referred to as writers or table builders. A table may store multiple time series. A table may be a named entity that stores related time series that are usable by the same application and often managed by the same customer of the database 100. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The database 100 may adapt to varying throughput quickly and dynamically, e.g., such that clients can begin providing time-series data without prior allocation of hosts and storage resources. In some embodiments, the control plane 180 may dynamically increase or decrease the number of partitions based (at least in part) on the amount or rate of ingestion or writing of time-series data, as determined using one or more metrics that indicate the heat of one or more time-series or partitions. The database 100 may co-locate elements of related time series in the storage resources 160A-160N for efficient storage and retrieval. The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. In the hot tier 150A, time-series data may be divided among two-dimensional tiles along both spatial and temporal axes. As another example, the database 100 may include a cold tier that offers higher latency (but a lower cost) by storing a longer interval of time-series data using persistent storage resources such as disk drives. The database 100 may include other tiers such as a warm tier that stores recent time-series data in non-volatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits customers (e.g., developers of applications) and other systems to perform management and modeling of time series data. For example, a component for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, customers may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks such as one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys associated with individual time series. A tile may be created with a predetermined storage capacity of storage resources (including memory resources). The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism. Using the auto-scaling techniques described herein, a particular storage node (e.g., storage tier 150A) may use a heat monitoring component 161 to monitor the heat of a particular tile under its management. The heat may refer to the rate of writing data or consuming the storage capacity of a tile, and monitoring the heat may include monitoring the rate of writing time-series data to a tile. The heat may refer to throughput, and monitoring the heat may include monitoring the throughput of time-series data at a particular tile. Monitoring the heat may include monitoring the heat spatially, e.g., on a key-by-key or time-series-by-time-series basis. In some embodiments, monitoring the heat may include monitoring the heat temporally, e.g., for individual units of time within the time range of the tile. In some embodiments, if the heat for a tile exceeds some threshold, or if the storage node anticipates that the storage capacity will be insufficient for the total amount of time-series data within the spatial and temporal boundaries of the tile, then a split of the tile may be performed. A tile split may be recommended or requested by the storage node that stores the tile and implemented by the control plane 180.

Depending on one or more criteria or conditions, the tile may be split in the temporal dimension or in the spatial dimension. Using a component 162 for temporal/spatial split analysis, a storage node may determine whether to request a temporal split or a spatial split. A spatial split may generate two (or more) tiles with the original temporal boundaries but having respective portions of the original spatial boundaries, e.g., by redistributing different time series across the new tiles. A temporal split may generate two (or more) tiles with the original spatial boundaries but having respective portions of the original temporal boundaries, e.g., with one tile's temporal boundaries ending at a split point and the other tile's temporal boundaries beginning at the split point. Spatial splits may require the movement of data from the original tile to one or more of the tiles resulting from the split and potentially from one storage node to another storage node across a network. For example, if a tile's spatial range is effectively split in half, then approximately half of the existing data in the original tile may be moved to a new tile on different storage node while the remaining half may stay in the original tile (reconfigured with a new spatial range), or each half of the data may be moved to new tiles. Temporal splits may not require such data movement and may thus allow the time-series database 100 to be more available for writing new data. In some embodiments, the split analysis component 162 may decide between a temporal split and a spatial split based (at least in part) on the anticipated cost of data movement for time-series data accumulated in a tile. The anticipated cost may represent a resource usage metric, e.g., for moving data around within storage resources 160A.

In some embodiments, a temporal split may be performed rather than a spatial split if one or more conditions are met. The split analysis component 162 may perform all or part of the analysis that produces a recommendation of a temporal or spatial split. The split analysis 162 may represent a heuristic approach that seeks to perform temporal splits if the resource usage of spatial splits would be excessive. In one embodiment, a temporal split may be requested and performed based (at least in part) on a predetermined percentage of the tile's temporal range having passed (such that a spatial split would require excessive data movement). In one embodiment, a temporal split may be requested and performed based (at least in part) on the tile's temporal range being not less than a minimum value (to prevent tiles from representing very short times and prevent data fragmentation from consuming excessive storage resources or harming query performance). In one embodiment, a temporal split may be requested and performed based (at least in part) on the current time being within the tile's temporal boundaries. In one embodiment, a temporal split may be requested and performed based (at least in part) on the current time plus a buffer time being before the end of the tile's temporal boundaries. In some embodiment, machine learning approaches may be used to enhance the split analysis 162, e.g., to predict when heat will increase and provision tiles with sufficient capacity or initiate spatial splits before too much data has accumulated in tiles. Auto-scaling of two-dimensional tiles in a time-series database may be performed using temporal splits instead of spatial splits to reduce data movement for current tiles (e.g., tiles whose temporal ending points have not been reached).

A component of the storage resources 160A such as the split analysis 162 may generate a request for a temporal split or a spatial split and send the request to the control plane 180. In some embodiments, a temporal split request may include a recommended split point within the temporal boundaries of the original tile. In some embodiments, a spatial split request may include a recommended split point within the spatial boundaries of the original tile, e.g., such that the heat is evenly distributed over the two new tiles. The control plane 180 may perform the partition splitting 181 by interacting with one or more components of the time-series database 100, e.g., one or more of the storage nodes 160A, one or more of the stream processors 140, and/or one or more of the ingestion routers 110. For example, the control plane 180 may cause the stream processors 140 to adjust the partitioning of time-series data into two-dimensional tiles, where such adjustments may also lead to reassigning specific stream processors to specific partitions. In one embodiment, the partition splitting 181 may be performed across all the replicas of a tile at various storage nodes or other storage location. In one embodiment, requests to split and/or merge partitions may be associated with relative priorities, and the control plane 180 may reject some split requests if their priority is sufficiently low. Ingestion and writing of time-series data within the spatial and temporal boundaries of the original tile may continue while the split is being performed.

In one embodiment, one or more components of the distributed database 100, such as hosts 110, 140 and 170, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

Figure 7:
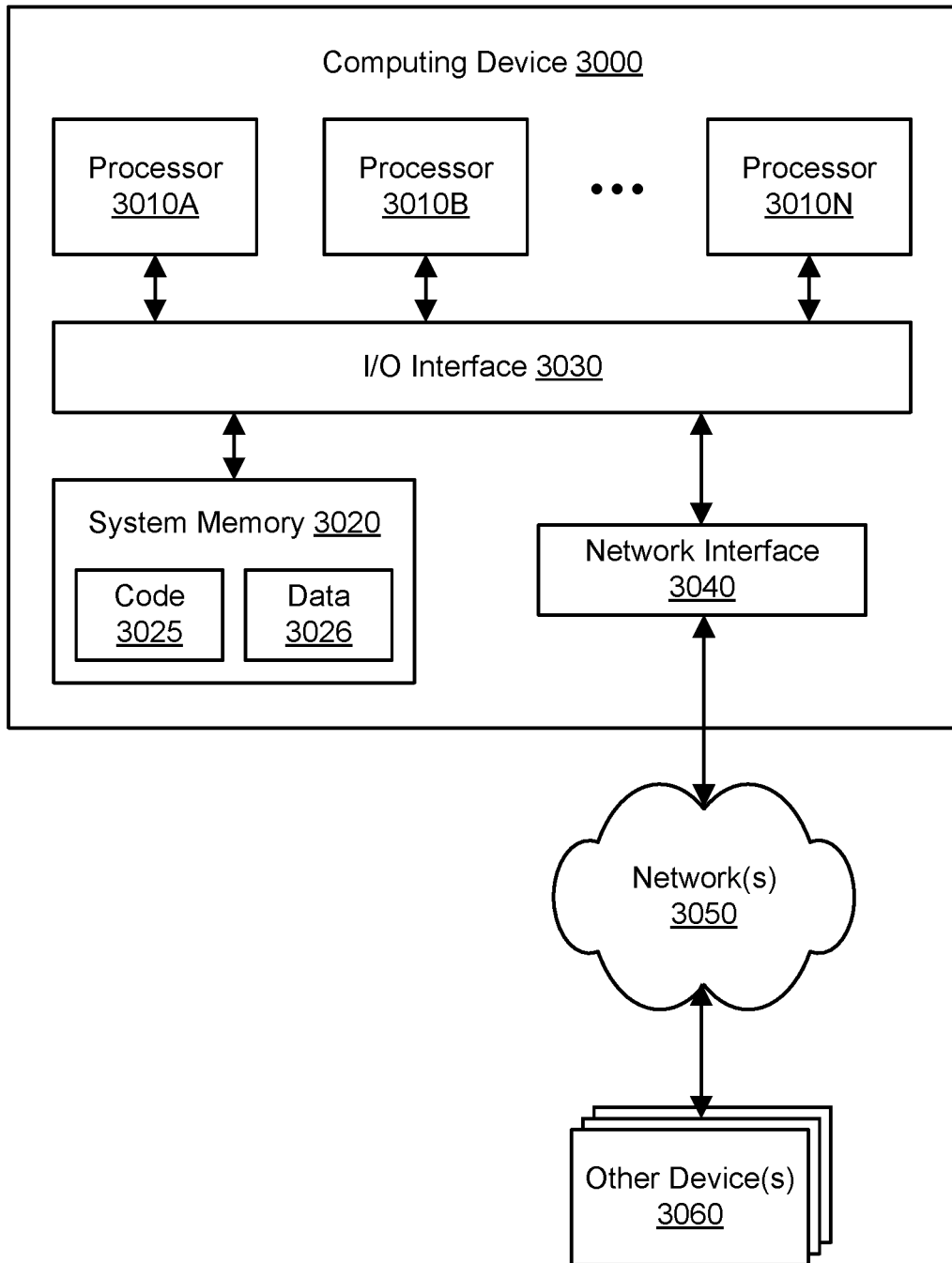
FIG. 7 illustrates an example computing device that may be used in some embodiments.

In various embodiments, components of the distributed database 100, such as the ingestion routers 110, streaming service 120, stream processors 140, storage resources 160A-160N, query processors 170, heat analyzer 185, and/or control plane 180 may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. Client devices 190 may be managed or owned by one or more customers of the database 100. For example, a particular customer may be a business that sells sensor devices for installation in residences and businesses, and those sensor devices may represent the client devices 190. In one embodiment, the client devices may be implemented using any suitable number and configuration of computing devices, any of which may be implemented by the example computing device 3000 illustrated in FIG. 7. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
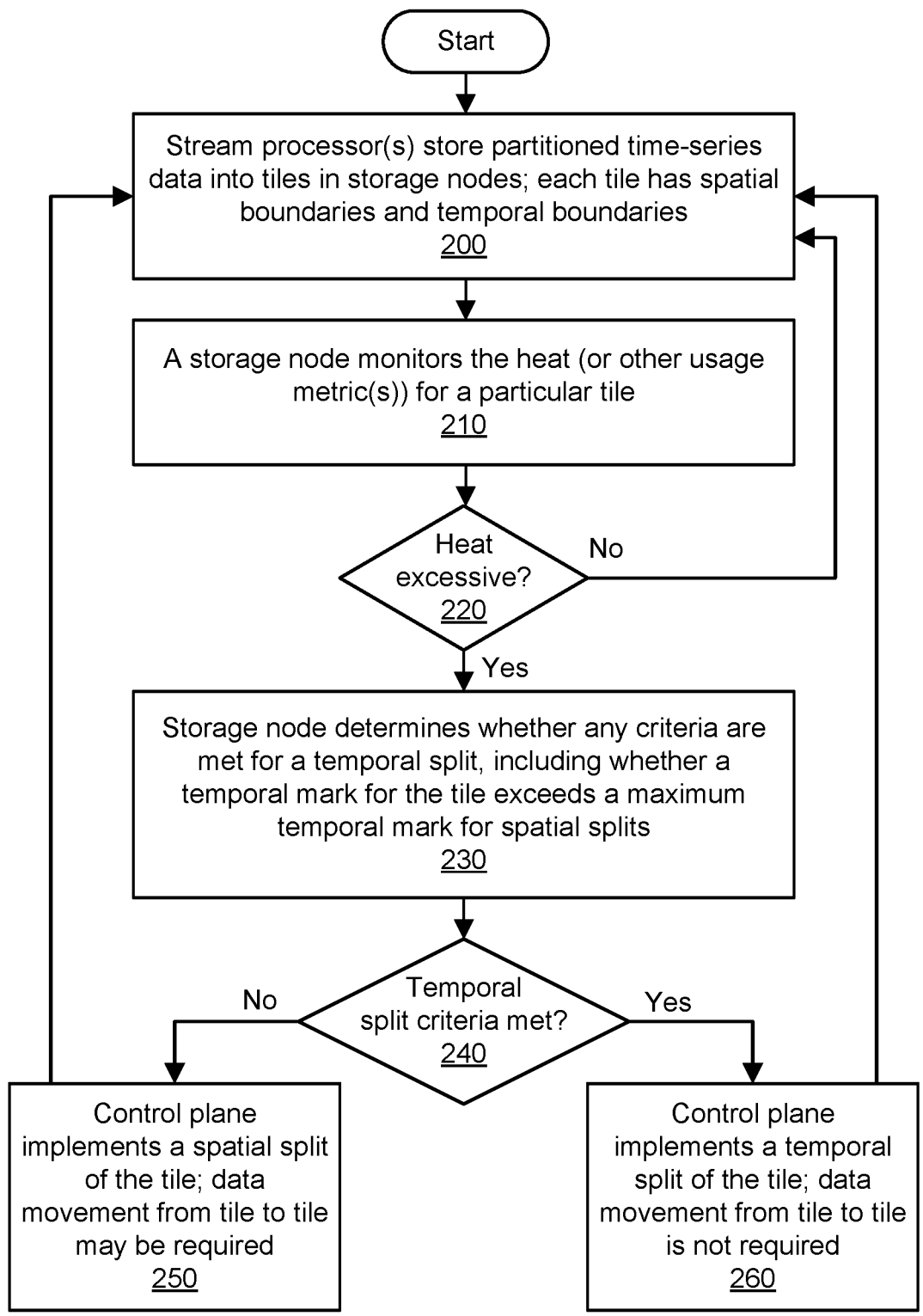
FIG. 2 is a flowchart illustrating a method for auto-scaling using temporal splits in a time-series database, according to some embodiments.

FIG. 2 is a flowchart illustrating a method for auto-scaling using temporal splits in a time-series database, according to some embodiments. As shown in 200, one or more stream processors may store partitioned time-series data into two-dimensional tiles at storage nodes. A tile may have spatial boundaries (e.g., a range or set of keys or time-series identifiers) and temporal boundaries (e.g., a starting time and an ending time). The time-series data written to a given tile may be within the spatial and temporal boundaries of that tile.

As shown in 210, a storage node may monitor the heat for a particular tile under its management. Monitoring the heat may include monitoring the rate of writing time-series data to a tile. Monitoring the heat may include monitoring the rate of decrease of the available storage capacity of a tile. As shown in 220, the method may determine whether the tile's heat is excessive, e.g., relative to some threshold or set of criteria. For example, if the storage node anticipates that the storage capacity will be insufficient for the total amount of time-series data within the spatial and temporal boundaries of the tile, then a split of the tile may be requested.

As shown in 230 and 240, the storage node may determine whether any criteria are met for a temporal split. The storage node may perform a split analysis to determine whether the tile should be split spatially or temporally. For example, the storage node may determine a temporal mark representing the position of the current time (e.g., a wall clock time) within the temporal boundaries of the current tile, and a spatial split may be requested if the temporal mark is less than or equal to a maximum temporal mark for spatial splits. The various criteria for a temporal or spatial split are further discussed with respect to FIG. 3.

As shown in 250, if the criteria for a temporal split are not met, then the control plane may implement a spatial split of the tile. The tile may be split at a point in the spatial range (e.g., a set of keys or time-series identifiers). The split point may be requested by the storage node that performed the split analysis. A spatial split may generate two (or more) tiles with the original temporal boundaries but having respective portions of the original spatial boundaries, e.g., by redistributing different time series across the new tiles. Spatial splits may require the movement of data from the original tile to one or more of the tiles resulting from the split. For example, if a tile's spatial range is effectively split in half, then approximately half of the existing data in the original tile may be moved to a new tile (potentially to another storage node via a network) while the remaining half may stay in the original tile (reconfigured with a new spatial range), or each half of the data may be moved to new tiles. Such data movement may consume computational, network, and storage resources and may thus reduce the latency of writing newly received time-series data to the storage tier.

As shown in 260, if the criteria for a temporal split are met, then the control plane may implement a temporal split of the tile. The tile may be split at a point in time within the original time range of the tile. The split point may be requested by the storage node that performed the split analysis. A temporal split may generate two (or more) tiles with the original spatial boundaries but having respective portions of the original temporal boundaries, e.g., with one tile's temporal boundaries ending at a split point and the other tile's temporal boundaries beginning at the split point. In contrast to spatial splits, temporal splits may not require such data movement and may thus allow the time-series database to be more available for writing new data. Spatial splits and/or temporal splits as well as spatial merges may be performed again and again for tiles in the storage tier 150A to auto-scale the storage resources 160A for ingested time-series data.

Figure 3:
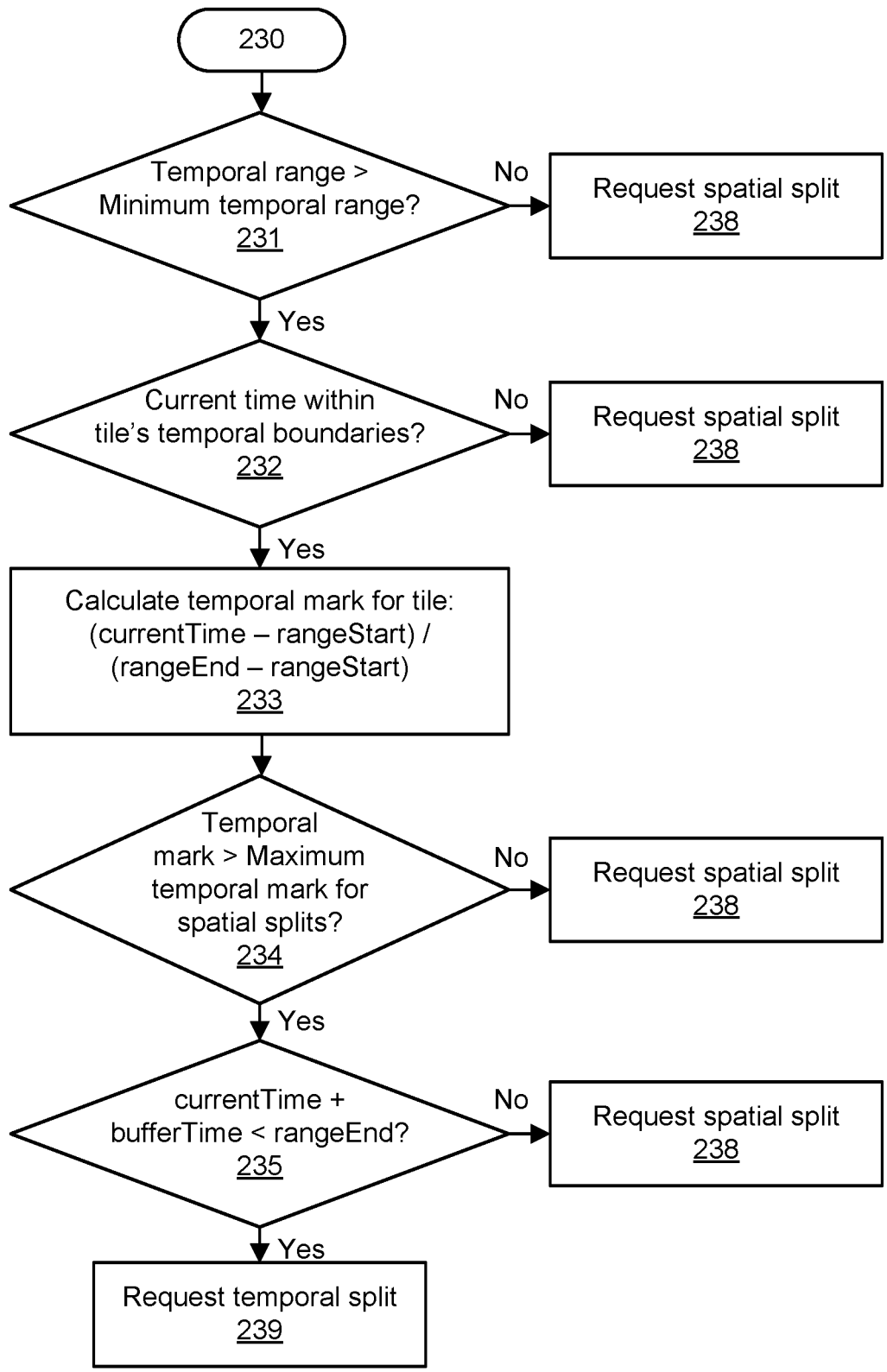
FIG. 3 is a flowchart illustrating further aspects of the method for auto-scaling using temporal splits in a time-series database, including evaluation of a series of criteria for temporal or spatial splits, according to some embodiments.

FIG. 3 is a flowchart illustrating further aspects of the method for auto-scaling using temporal splits in a time-series database, including evaluation of a series of criteria for temporal or spatial splits, according to some embodiments. The operations shown in FIG. 3 may represent aspects of the split analysis shown in 230. The split analysis may produce a request for a spatial split (as shown in 238) or a request for a temporal split (as shown in 239). In some embodiments, the operations shown in FIG. 3 may vary in order. In some embodiments, two or more of the operations shown in FIG. 3 may be performed concurrently.

As shown in 231, the split analysis may determine whether the temporal range of the tile (representing the duration in time between the starting time and the ending time) is greater than a minimum temporal range (also representing a duration of time). The minimum temporal range may be set to a suitable duration (e.g., fifteen minutes) to ensure that tiles do not represent undesirably small slices of time. If the current tile's duration is smaller than the minimum duration, then the split analysis may request a spatial split as shown in 238. Otherwise the method may continue with the operation shown in 232.

As shown in 232, the split analysis may determine whether the current time (e.g., the wall clock time at the storage node) is within the temporal boundaries of the tile (e.g., between the starting time and the ending time). If not, then the split analysis may request a spatial split as shown in 238. Otherwise the method may continue with the operation shown in 233.

As shown in 233, the split analysis may calculate a temporal mark for the tile. The temporal mark may be calculated by dividing a difference between the current time and the tile's starting time (rangeStart) by a difference between the tile's ending time (rangeEnd) and the tile's starting time (rangeStart). The temporal mark may represent a ratio of elapsed time to unelapsed time within the tile's temporal boundaries. For example, if a tile's starting time is 2 PM and its ending time is 3 PM, and the current time is 2:30 PM, then the temporal mark may be calculated as 0.5.

As shown in 234, the split analysis may compare the temporal mark to a maximum temporal mark for spatial splits. The maximum temporal mark may represent a point (within the temporal boundaries of the tile) beyond which a temporal split is preferred over a spatial split. After a sufficient amount of time has passed since the opening of the tile, enough time-series data may have been written to the tile to represent a burden on the database 100 for data movement during a spatial split. The maximum temporal mark may represent that point in time. In one embodiment, the maximum temporal mark may represent a percentage or ratio. For example, if the maximum temporal mark is 0.3, and the temporal mark (based on the current time) is 0.2, then a spatial split may be requested as shown in 238 with the expectation that the amount of accumulated data to be moved is not burdensome. However, if the maximum temporal mark is 0.3, and the temporal mark (based on the current time) is 0.4, then a temporal split may be given further consideration as shown in 235.

As shown in 235, the split analysis may determine whether the current time plus a buffer time is less than the ending time (rangeEnd) of the tile's temporal boundaries. The buffer time may represent an approximate duration for requesting and performing the split, e.g., five minutes. If the current time plus the buffer time is not less than the ending time, then the split analysis may request a spatial split (as shown in 238) based on the expectation that a split would not have sufficient time to be completed before the tile's ending time arrives. In such a scenario, the control plane may not perform the spatial split for the current tile but may instead spatially split the tile with the same spatial boundaries and the next set of temporal boundaries. Otherwise all the criteria for a temporal split may be deemed satisfied, and the split analysis may request a temporal split as shown in 239. In one embodiment, the storage node or control plane may determine the split point as the current time plus the buffer time.

Figure 4:
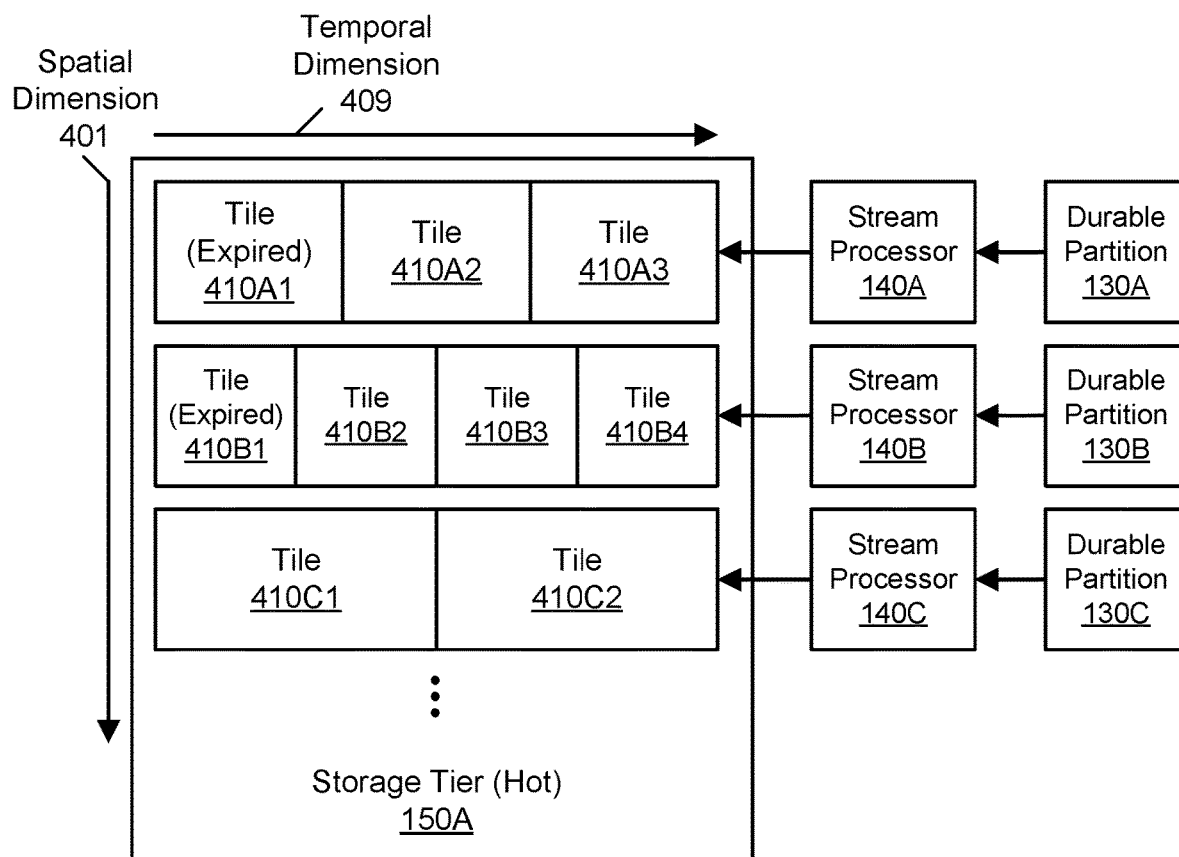
FIG. 4 illustrates an example of storage of time-series data using two-dimensional tiles in a hot tier, according to some embodiments.

FIG. 4 illustrates an example of storage of time-series data using two-dimensional tiles in a hot tier, according to some embodiments. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical and/or schema-based clustering that seeks to co-locate related time series in the same partition, and the clustering may be performed by the ingestion routers 110. Tiles may also be partitioned along non-overlapping temporal boundaries. Due to the spatial dimension 401 and the temporal dimension 409, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ. In one embodiment, if the clustering scheme is changed, then subsequent tiles may be reorganized to reflect the clustering change over time.

In the example of FIG. 4, a set of time series may be mapped to durable partitions 130A, 130B, and 130C based on a spatial range (e.g., schema-based clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 4, stream processor 140A may write to an open tile 410A3 that was preceded in time by a tile 410A2 that was preceded in time by a now-expired tile 410A. Similarly, stream processor 140B may write to an open tile 410B4 that was preceded in time by a tile 410B3 that was preceded in time by a tile 410B2 that was preceded in time by a now-expired tile 410B1. Additionally, stream processor 140C may write to an open tile 410C2 that was preceded in time by a tile 410C1. As discussed above, the contents of a tile may be replicated (e.g., using three replicas) across different location or zones to achieve greater durability of the hot tier.

Figure 5A:
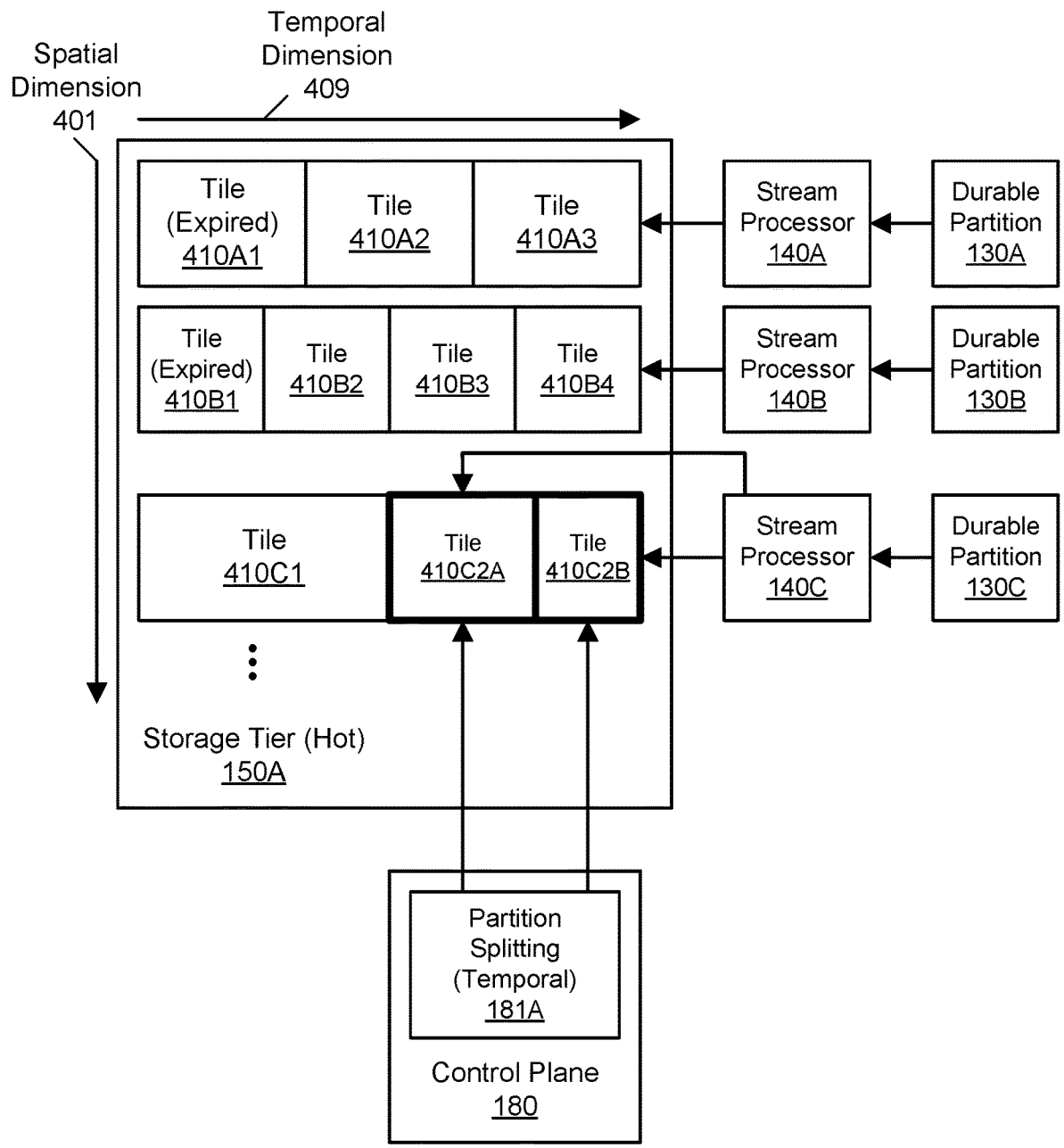
FIG. 5A, FIG. 5B, and FIG. 5C illustrate examples of a temporal split of a two-dimensional tile storing time-series data in a hot tier, according to some embodiments.

FIG. 5A illustrates an example of a temporal split of a two-dimensional tile storing time-series data in a hot tier, according to some embodiments. As discussed above, in some circumstances, a tile may be split in the temporal dimension and not in the spatial dimension. For example, tile 410C2 (as shown in FIG. 4) may experience excessive heat on one or more keys within its spatial range. As a result of the split analysis described with respect to FIG. 3 and FIG. 4, the control plane 180 may perform a temporal partition splitting 181A on the tile 410C2. The temporal split may generate two new tiles 410C2A and 410C2B having the original spatial boundaries of the tile 410C2 but having respective portions of the original temporal boundaries. The temporal boundaries of the tile 410C2A may begin at the original starting point of the tile 410C2 and end at a split point within the temporal range of the original tile (e.g., the current time plus a buffer time). The temporal boundaries of the tile 410C2B may begin at the split point and end at the original ending point of the tile 410C2. In various embodiments, the new tiles 410C2A and 410C2B may represent equal or unequal durations. In one embodiment, the stream processor 140A may continue writing newly received time-series data within the spatial boundaries of the tile 410C2 to the new tiles 410C2A and 410C2B.

Figure 5B:
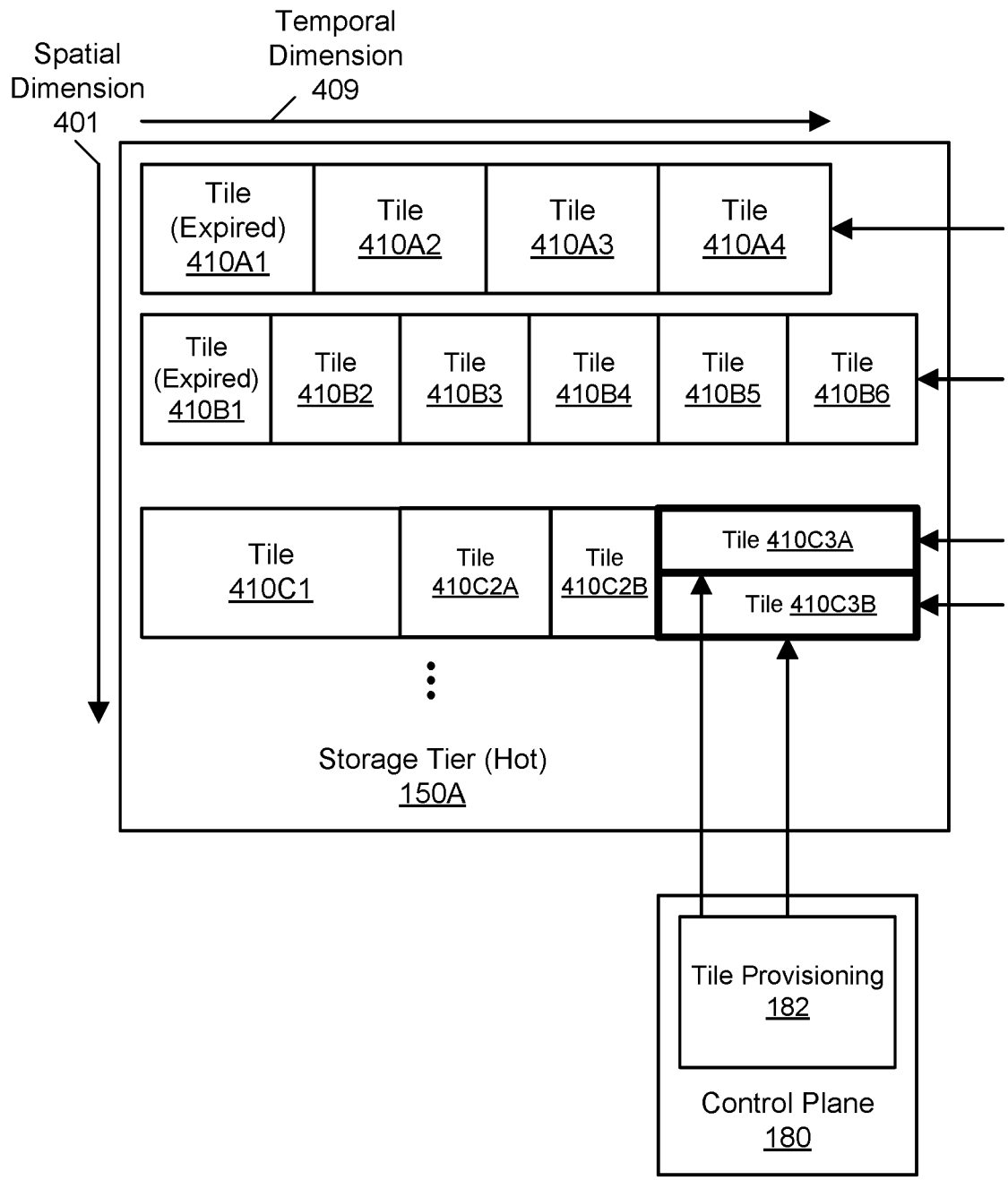

As shown in FIG. 5A, a tile 410C2 may be split in the temporal dimension and not in the spatial dimension due to an increase in heat on the spatial range of the original tile. As shown in FIG. 5B, the temporal split may not be propagated to future tiles (e.g., tiles having the same spatial boundaries but newer temporal boundaries). However, to account for the increasing heat on the spatial range of the tile 410C2, the control plane 180 may use a component 182 for tile provisioning to provision future tiles for that spatial range such that the spatial range is divided across two or more tiles. Such a spatial split may be performed in advance of time-series data being written to the resulting tiles (e.g., by pre-provisioning tiles with the described boundaries) such that little to no data movement need be performed as a result of the split. For example, instead of provisioning another tile with the same spatial range as the tiles 410C2A and 410C2B, the control plane 180 may provision two tiles 410C3A and 410C3B that represent a split of the original spatial range. As a result of the split analysis described with respect to FIG. 3 and FIG. 4, the control plane 180 may perform tile provisioning 182 such that tiles 410C3A and 410C3B representing a newer window of time are provisioned with a spatial split. The spatial split may generate two new tiles 410C3A and 410C3B having the same duration of the tile 410C2 but having respective portions of the original spatial boundaries. The split point may be determined (e.g., by the storage node that performs heat tracking) such that the heat is evenly distributed across the new tiles. For example, if the original tile 410C2 included keys E, F, G, H, I, and J, and the heat increase is relatively even across all the keys, then the spatial boundaries of the tile 410C3A may include keys E, F, and G, while the spatial boundaries of the tile 410C3B may include keys H, I, and J. As another example, if the heat increase is primarily detected for the key E, then the spatial boundaries of the tile 410C3A may include keys E and F, while the spatial boundaries of the tile 410C3B may include keys G, H, I, and J. By performing pre-provisioning of tiles in this manner to account for an increase in heat on a spatial range, the control plane 180 may reduce the likelihood of another split needing to be performed.

Figure 5C:
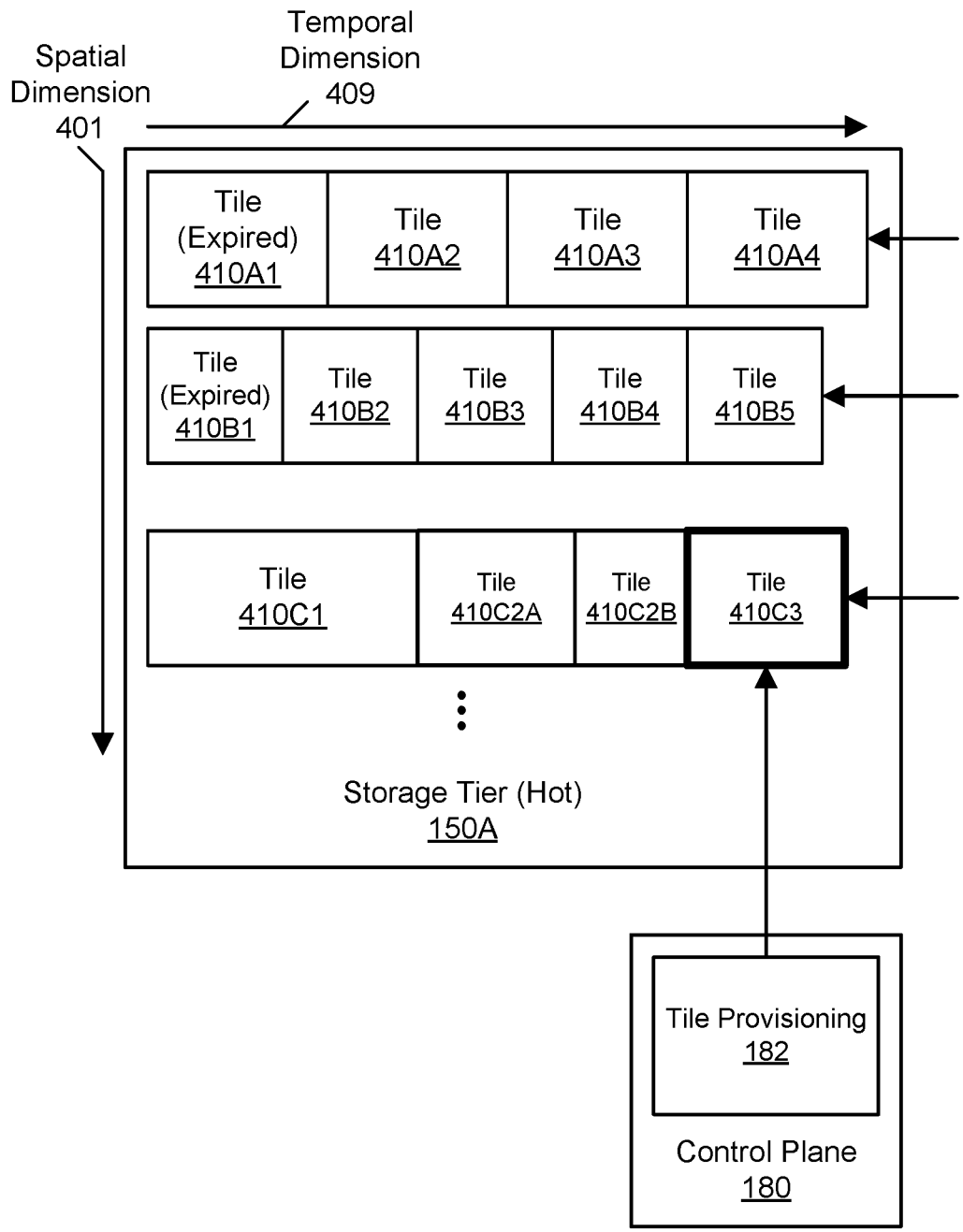

As shown in FIG. 5A, a tile 410C2 may be split in the temporal dimension and not in the spatial dimension due to an increase in heat on the spatial range of the original tile. As shown in FIG. 5C, the temporal split may be represented in future tiles (e.g., tiles having the same spatial boundaries but newer temporal boundaries) by reducing the duration of tiles for the same spatial range. For example, instead of provisioning another tile with the same duration as the tiles 410C1 and 410C2, the control plane 180 may use a component 182 for tile provisioning to provision a new tile 410C3 for the same spatial range but a newer temporal range. The tile 410C3 may represent a shorter temporal range than the tiles 410C1 and 410C2, e.g., such that the new tiles has the same duration or a similar duration as the tile 410C2A that resulted from the earlier temporal split. By performing pre-provisioning of tiles in this manner to account for an increase in heat on a spatial range, the control plane 180 may reduce the likelihood of another split needing to be performed.

Figure 6A:
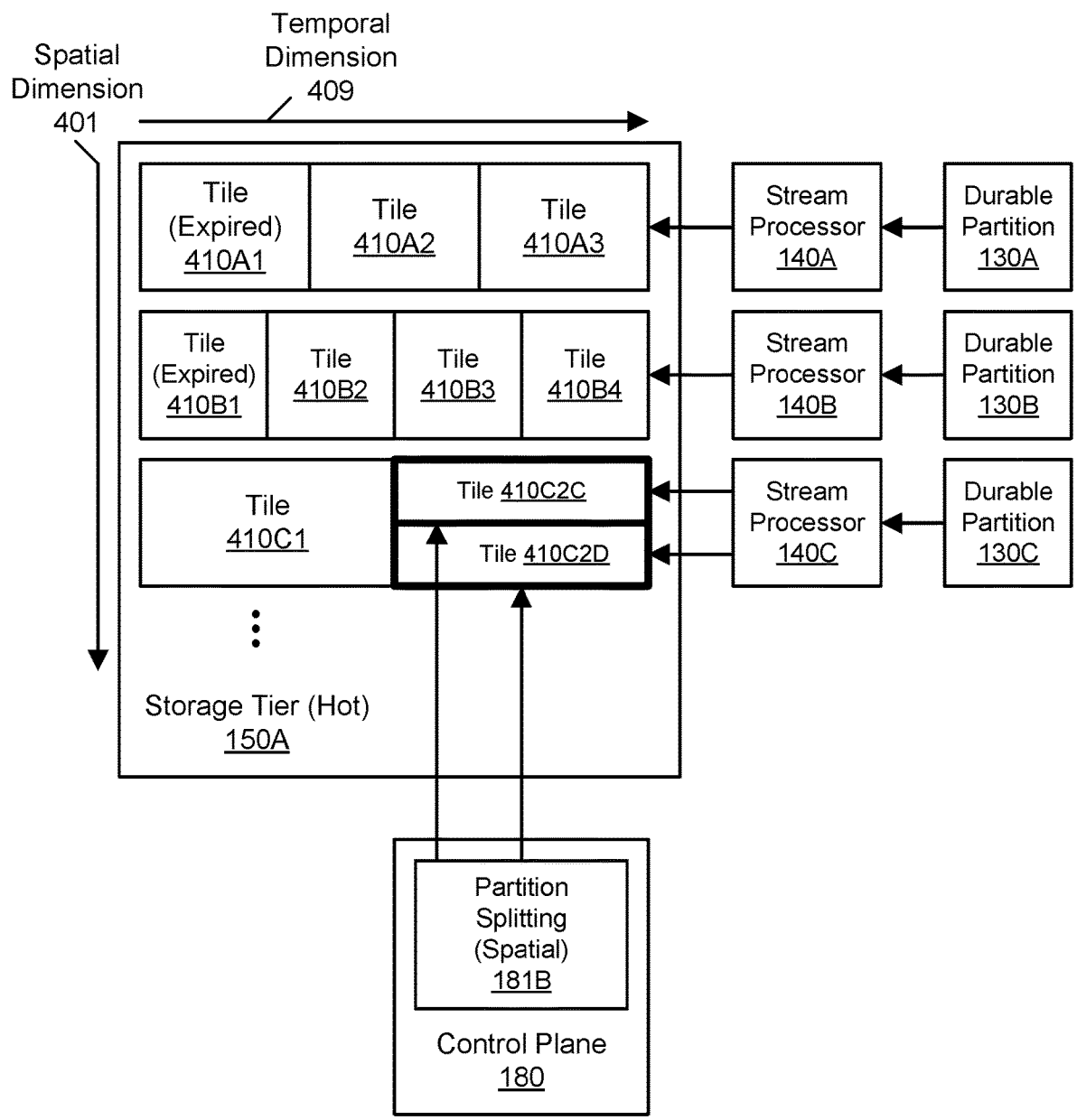
FIG. 6A and FIG. 6B illustrate examples of a spatial split of a two-dimensional tile storing time-series data in a hot tier, according to some embodiments.

FIG. 6A illustrates an example of a spatial split of a two-dimensional tile storing time-series data in a hot tier, according to some embodiments. As discussed above, in some circumstances, a tile may be split in the spatial dimension and not in the temporal dimension. For example, tile 410C2 (as shown in FIG. 4) may experience excessive heat on one or more keys within its spatial range. As a result of the split analysis described with respect to FIG. 3 and FIG. 4, the control plane 180 may perform a spatial partition splitting 181B on the tile 410C2. The spatial split may generate two new tiles 410C2C and 410C2D having the original temporal boundaries of the tile 410C2 but having respective portions of the original spatial boundaries. The split point may be determined (e.g., by the storage node that performs heat tracking) such that the heat is evenly distributed across the new tiles. For example, if the original tile 410C2 included keys E, F, G, H, I, and J, and the heat increase is relatively even across all the keys, then the spatial boundaries of the tile 410C2C may include keys E, F, and G, while the spatial boundaries of the tile 410C2D may include keys H, I, and J. As another example, if the heat increase is primarily detected for the key E, then the spatial boundaries of the tile 410C2C may include keys E and F, while the spatial boundaries of the tile 410C2D may include keys G, H, I, and J. In one embodiment, the stream processor 140A (and potentially one or more additional stream processors) may continue writing newly received time-series data within the temporal boundaries of the tile 410C2 to the new tiles 410C2C and 410C2D.

Figure 6B:
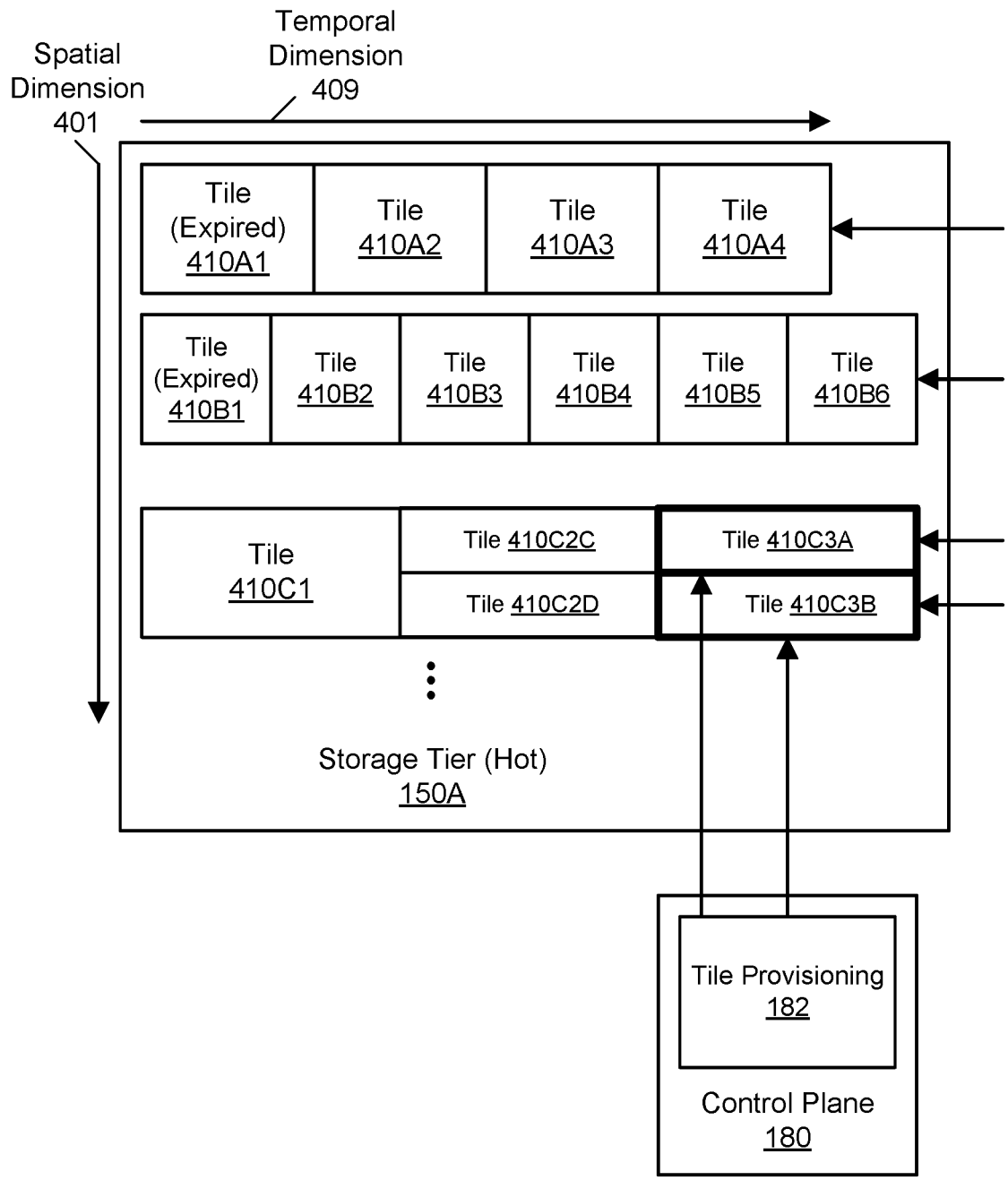

As shown in FIG. 6A, a tile 410C2 may be split in the spatial dimension due to an increase in heat on the spatial range of the original tile. As shown in FIG. 6B, the spatial split may be propagated to future tiles (e.g., tiles having the same spatial boundaries but newer temporal boundaries). To account for the increasing heat on the spatial range of the tile 410C2, the control plane 180 may use a component 182 for tile provisioning to provision future tiles for that spatial range such that the spatial range continues to be divided across multiple tiles. Such a spatial split may be performed in advance of time-series data being written to the resulting tiles (e.g., by pre-provisioning tiles with the described boundaries) such that little to no data movement need be performed as a result of the split. For example, the control plane 180 may provision another tile 410C3A having the same spatial range as tile 410C2C but having a newer temporal range and also another tile 410C3B having the same spatial range as tile 410C2D but having a newer temporal range. The split point may be determined such that the heat in the original spatial range is evenly distributed across the new tiles. By performing pre-provisioning of tiles in this manner to account for an increase in heat on a spatial range, the control plane 180 may reduce the likelihood of another split needing to be performed.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of storage nodes of a time-series database, wherein the storage nodes store time-series data partitioned into a plurality of partitions, wherein respective ones of the partitions are stored in the storage nodes as two-dimensional tiles of partitioned time-series data, wherein a first dimension of the two-dimensional tiles corresponds to a quantity or throughput of time-series data elements that can be written to a given one of the two-dimensional tiles in a unit of time and wherein a second dimension of the two-dimensional tiles corresponds to a quantity of units of time for which time-series data elements are included in the given one of the two-dimensional tiles, and wherein the storage nodes comprise a first storage node; and
   one or more stream processors configured to write, into the two-dimensional tiles, time-series data of a plurality of time series, wherein the two-dimensional tiles comprise a current tile stored by the first storage node, wherein the current tile represents spatial boundaries and temporal boundaries in the first and second dimensions, and wherein elements of the time-series data written to the current tile are within the spatial boundaries and the temporal boundaries; and
   wherein the first storage node comprises one or more processors and a memory to store computer-executable instructions that, when executed, cause the one or more processors to:
      determine that the current tile lacks a throughput or a storage capacity to store an anticipated quantity of the time-series data within the spatial boundaries and the temporal boundaries;
      determine a temporal mark associated with the current tile, wherein the temporal mark represents a position of a current time within the temporal boundaries of the current tile; and
      determine that the temporal mark is greater than a threshold value, wherein the current tile is split temporally into a first new tile and a second new tile based at least in part on the temporal mark being greater than the threshold value, wherein the first new tile represents the spatial boundaries and a first portion of the temporal boundaries prior to a split point, and wherein the second new tile represents the spatial boundaries and a second portion of the temporal boundaries after the split point.

2. The system as recited in claim 1, wherein the temporal boundaries define a temporal range of the current tile, and wherein the memory stores additional computer-executable instructions that, when executed, cause the one or more processors to:
   determine that the temporal range is greater than a minimum temporal range, wherein the current tile is split into the first new tile and the second new tile based at least in part on the temporal range being greater than the minimum temporal range.

3. The system as recited in claim 1, wherein the memory stores additional computer-executable instructions that, when executed, cause the one or more processors to:
   determine that the current time is within the temporal boundaries, wherein the current tile is split into the first new tile and the second new tile based at least in part on the current time being within the temporal boundaries.

4. The system as recited in claim 1, wherein the temporal boundaries comprise a starting time and an ending time, and wherein the memory stores additional computer-executable instructions that, when executed, cause the one or more processors to:
  determine that the current time plus a buffer time is less than the ending time, wherein the current tile is split into the first new tile and the second new tile based at least in part on the current time plus the buffer time being less than the ending time.

5. A method, comprising:
  writing, by one or more stream processors of a time-series database, time-series data of a plurality of time series into a plurality of partitions, wherein respective ones of the partitions are stored as two-dimensional tiles of partitioned time-series data, wherein a first dimension of the two-dimensional tiles corresponds to a quantity or throughput of time-series data elements that can be written to a given one of the two-dimensional tiles in a unit of time and wherein a second dimension of the two-dimensional tiles corresponds to a quantity of units of time for which time-series data elements are included in the given one of the two-dimensional tiles, wherein the two-dimensional tiles comprise an individual tile representing spatial boundaries and temporal boundaries, and wherein elements of the time-series data written to the individual tile are within the spatial boundaries and the temporal boundaries of the individual tile; and
  determining that a throughput or a rate of writing the elements of the time-series data to the individual tile exceeds a threshold rate;
  performing a comparison of a current time to the temporal boundaries, wherein the comparison indicates that the current time is beyond a threshold point within the temporal boundaries;
  based at least in part on the comparison of the current time to the temporal boundaries, performing a split of the individual tile into a first new tile and a second new tile, wherein the first new tile represents the spatial boundaries and a first portion of the temporal boundaries prior to a split point, and wherein the second new tile represents the spatial boundaries and a second portion of the temporal boundaries after the split point.

6. The method as recited in claim 5, wherein the temporal boundaries define a temporal range of the individual tile, and wherein the method further comprises:
  determining that the temporal range is greater than a minimum temporal range, wherein the split of the individual tile is performed based at least in part on the temporal range being greater than the minimum temporal range.

7. The method as recited in claim 5, further comprising:
  determining that the current time is within the temporal boundaries, wherein the split of the individual tile is performed based at least in part on the current time being within the temporal boundaries.

8. The method as recited in claim 5, wherein the temporal boundaries comprise a starting time and an ending time, and wherein performing the comparison of the current time to the temporal boundaries further comprises:
  calculating a temporal mark by dividing a difference between the current time and the starting time by a difference between the ending time and the starting time; and
  determining that the temporal mark exceeds a maximum temporal mark for spatial splits.

9. The method as recited in claim 5, wherein the temporal boundaries comprise a starting time and an ending time, and wherein performing the comparison of the current time to the temporal boundaries further comprises:
  determining that the current time plus a buffer time is less than the ending time, wherein the split of the individual tile is performed based at least in part on the current time plus the buffer time being less than the ending time.

10. The method as recited in claim 5, further comprising:
  provisioning a third new tile representing the spatial boundaries of the individual tile and a newer set of temporal boundaries, wherein the newer set of temporal boundaries has a shorter duration than the temporal boundaries of the individual tile.

11. The method as recited in claim 5, wherein the determining that the rate exceeds the threshold rate is performed by a storage node that stores the individual tile, wherein a request to perform the split within the temporal boundaries is generated by the storage node, and wherein the split is implemented by a control plane of the time-series database.

12. The method as recited in claim 5, wherein the two-dimensional tiles comprise an additional tile representing additional spatial boundaries and additional temporal boundaries, and wherein additional elements of the time-series data written to the additional tile are within the additional spatial boundaries and the additional temporal boundaries, and wherein the method further comprises:
  determining that a throughput or a rate of writing the additional elements of the time-series data to the additional tile exceeds the threshold rate;
  performing an additional comparison of an additional current time to the additional temporal boundaries, wherein the additional comparison indicates that the additional current time is not beyond an additional threshold point within the additional temporal boundaries;
  based at least in part on the additional comparison, performing a split of the additional tile into a third new tile and a fourth new tile, wherein the third new tile represents the additional temporal boundaries and a first portion of the additional spatial boundaries, and wherein the fourth new tile represents the additional temporal boundaries and a second portion of the additional spatial boundaries.

13. One or more non-transitory computer-readable storage media storing program instructions that, when executed on or across one or more processors, perform:
  writing, by one or more stream processors of a time-series database, time-series data of a plurality of time series into a plurality of partitions, wherein respective ones of the partitions are stored as two-dimensional tiles of partitioned time-series data, wherein a first dimension of the two-dimensional tiles corresponds to a quantity or throughput of time-series data that can be written to a given one of the two-dimensional tiles in a unit of time and wherein a second dimension of the two-dimensional tiles corresponds to a quantity of units of time for which time-series data are included in the given one of the two-dimensional tiles, wherein the two-dimensional tiles comprise a current tile representing spatial boundaries and temporal boundaries, and wherein elements of the time-series data written to the current tile are within the spatial boundaries and the temporal boundaries; and
  determining that the current tile lacks a throughput or a storage capacity to store an anticipated amount of the time-series data within the spatial boundaries and the temporal boundaries;

performing a comparison of a current time to the temporal boundaries, wherein the comparison indicates that the current time is beyond a threshold point within the temporal boundaries;

based at least in part on the comparison of the current time to the temporal boundaries, performing a split of the current tile into a first new tile and a second new tile, wherein the first new tile represents the spatial boundaries and a first portion of the temporal boundaries prior to a split point, and wherein the second new tile represents the spatial boundaries and a second portion of the temporal boundaries after the split point.

14. The one or more non-transitory computer-readable storage media as recited in claim 13, wherein the temporal boundaries define a temporal range of the current tile, and wherein the storage media further comprise additional program instructions that, when executed on or across the one or more processors, perform:

determining that the temporal range is greater than a minimum temporal range, wherein the split of the current tile is performed based at least in part on the temporal range being greater than the minimum temporal range.

15. The one or more non-transitory computer-readable storage media as recited in claim 13, further comprising additional program instructions that, when executed on or across the one or more processors, perform:

determining that the current time is within the temporal boundaries, wherein the split of the current tile is performed based at least in part on the current time being within the temporal boundaries.

16. The one or more non-transitory computer-readable storage media as recited in claim 13, wherein the temporal boundaries comprise a starting time and an ending time, and wherein performing the comparison of the current time to the temporal boundaries further comprises:

calculating a temporal mark by dividing a difference between the current time and the starting time by a difference between the ending time and the starting time; and determining that the temporal mark exceeds a maximum temporal mark for spatial splits.

17. The one or more non-transitory computer-readable storage media as recited in claim 13, wherein the temporal boundaries comprise a starting time and an ending time, and wherein performing the comparison of the current time to the temporal boundaries further comprises:

determining that the current time plus a buffer time is less than the ending time, wherein the split of the current tile is performed based at least in part on the current time plus the buffer time being less than the ending time.

18. The one or more non-transitory computer-readable storage media as recited in claim 13, wherein the split point represents the current time plus a buffer time.

19. The one or more non-transitory computer-readable storage media as recited in claim 13, wherein the determining that the rate exceeds the threshold rate is performed by a storage node that stores the current tile, wherein a request to perform the split in the temporal boundaries is generated by the storage node, and wherein the split is implemented by a control plane of the time-series database.

20. The one or more non-transitory computer-readable storage media as recited in claim 13, further comprising additional program instructions that, when executed on or across the one or more processors, perform:

provisioning a third new tile and a fourth new tile, wherein the third new tile represents newer temporal boundaries and a first portion of the spatial boundaries, and wherein the fourth new tile represents the newer temporal boundaries and a second portion of the spatial boundaries.

\* \* \* \* \*